June 18, 1935.　　G. GORTON, 3D., ET AL　　2,005,696

MACHINE TOOL

Filed Jan. 13, 1934　　8 Sheets-Sheet 1

Fig. 1.

Inventors
George Gorton III
P. M. Henkes
George Horner

By Hubert E. Behr　Attorney

Fig. 2.

June 18, 1935.  G. GORTON, 3D., ET AL  2,005,696
MACHINE TOOL
Filed Jan. 13, 1934   8 Sheets-Sheet 5

June 18, 1935.  G. GORTON, 3D., ET AL  2,005,696

MACHINE TOOL

Filed Jan. 13, 1934    8 Sheets-Sheet 6

June 18, 1935.  G. GORTON, 3D., ET AL  2,005,696

MACHINE TOOL

Filed Jan. 13, 1934  8 Sheets-Sheet 8

Patented June 18, 1935

2,005,696

UNITED STATES PATENT OFFICE 2,005,696

MACHINE TOOL

George Gorton, 3d, Peter M. Henkes, and George Horner, Racine, Wis., assignors to George Gorton Machine Company, Racine, Wis., a corporation of Wisconsin Application January 13, 1934, Serial No. 706,540

23 Claims. (Cl. 90—13.2)

This invention relates to certain improvements in machine tools, and the objects and nature of the invention will be understood by those skilled in the art in the light of the following description of the accompanying drawings that illustrate what we now believe to be the preferred mechanical expression or embodiment of the invention from among other forms, arrangements and combinations within the spirit and scope thereof.

An object of the invention is the production of improved manually-controlled apparatus for the economical production of work, such as dies, molds and other articles, in duplication of a copy or master pattern, at a one to one ratio; in other words, to provide comparatively simple economical apparatus, say, of the milling or routing machine type for the economical production of work of the same size as and in duplication of the copy or master pattern.

A further object of the invention is to provide a milling, routing or other machine equipped for the purposes of our invention, with a rotary cutter head and a pattern tracing stylus head, adapted to be arranged in normal fixed operative relationship and relatively fixed locations, with respect to the work to be operated on by the cutter and the copy to be traced by the stylus, and a table adapted to carry both the work and the copy in relatively fixed relation to each other and in operative relation to the rotary cutter and to the tracing stylus, respectively, and to provide means whereby said table is freely movable universally in a plane perpendicular to the parallel axes of the rotary cutter and tracing stylus to carry the work and copy laterally with respect to the stationarily located rotary cutter and tracer spindle, and to provide manually actuated means capable of operation by a single handle, or from one station, for universally moving said table laterally through the medium of a power multiplying connection, for moving and controlling said table against the resistance of the rotating cutter on the work.

A further object of the invention is to provide a duplicating machine of the type having the rotary milling or other suitable cutter and the parallel spaced copy tracing stylus, normally relatively fixedly located with respect to each other and the copy and work, with a single table to which both the work and the copy are to be fixed, the table to be sensitive or freely universally movable laterally with respect to both the cutter and stylus, and arranged under the control of a universally movable operator's handle having leverage connection with the table for universally moving and controlling the same.

A further object of the invention is the provision of various improvements in detail, sub-organizations, and features, with the end in view of producing an advantageous and improved milling, routing or allied machine for the production of work in duplication of a master pattern or copy.

With the foregoing and other objects that will develop as the description proceeds, in view, our invention consists in certain novel features in structure, organization and combinations, as more fully and particularly described and specified hereinafter.

Referring to the accompanying drawings forming a part hereof.

Figure 1:
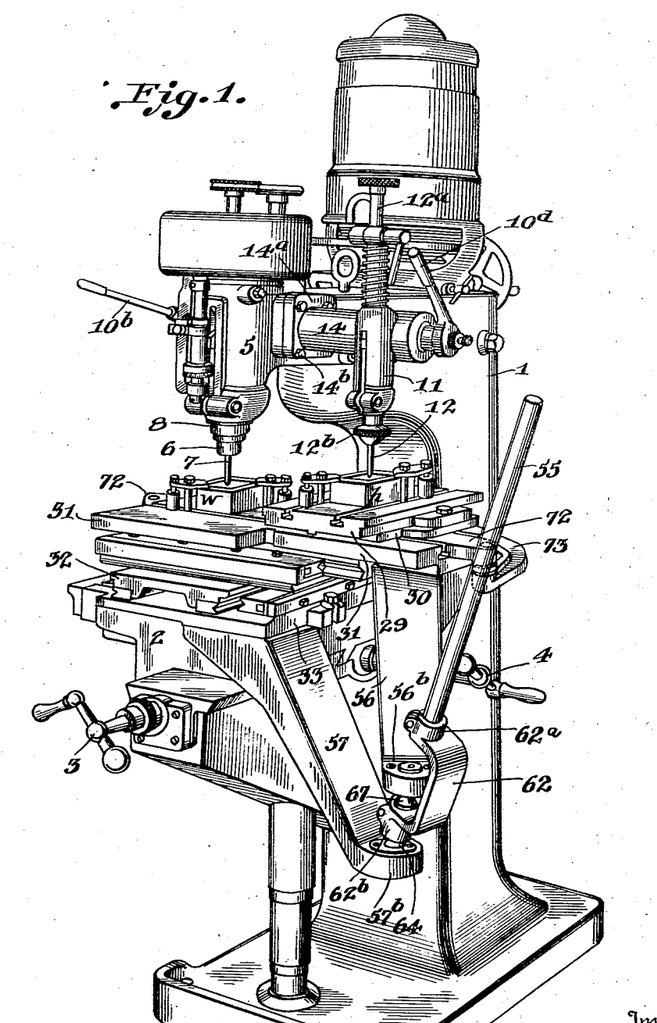
Fig. 1 shows in perspective a machine tool, say, of the vertical cutter spindle milling machine type equipped with an embodiment of our invention.
Figure 2:
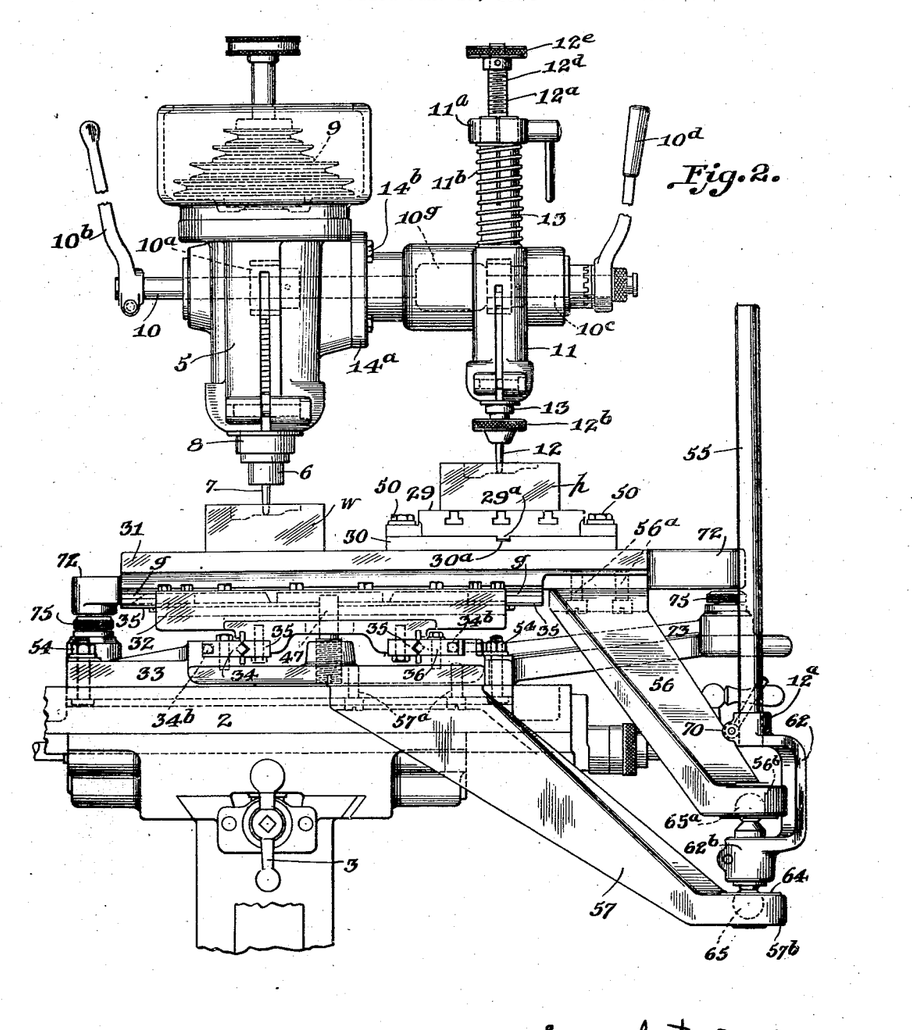
Fig. 2 is a front elevation more or less diagrammatically showing the cutter and tracing stylus heads and the sensitive table carrying the work and pattern, and the table operating and controlling means, and in part, the milling machine work support or table, certain parts being broken away or shown in section, and other parts indicated by dotted lines, the frame parts not being shown.
Figure 3:
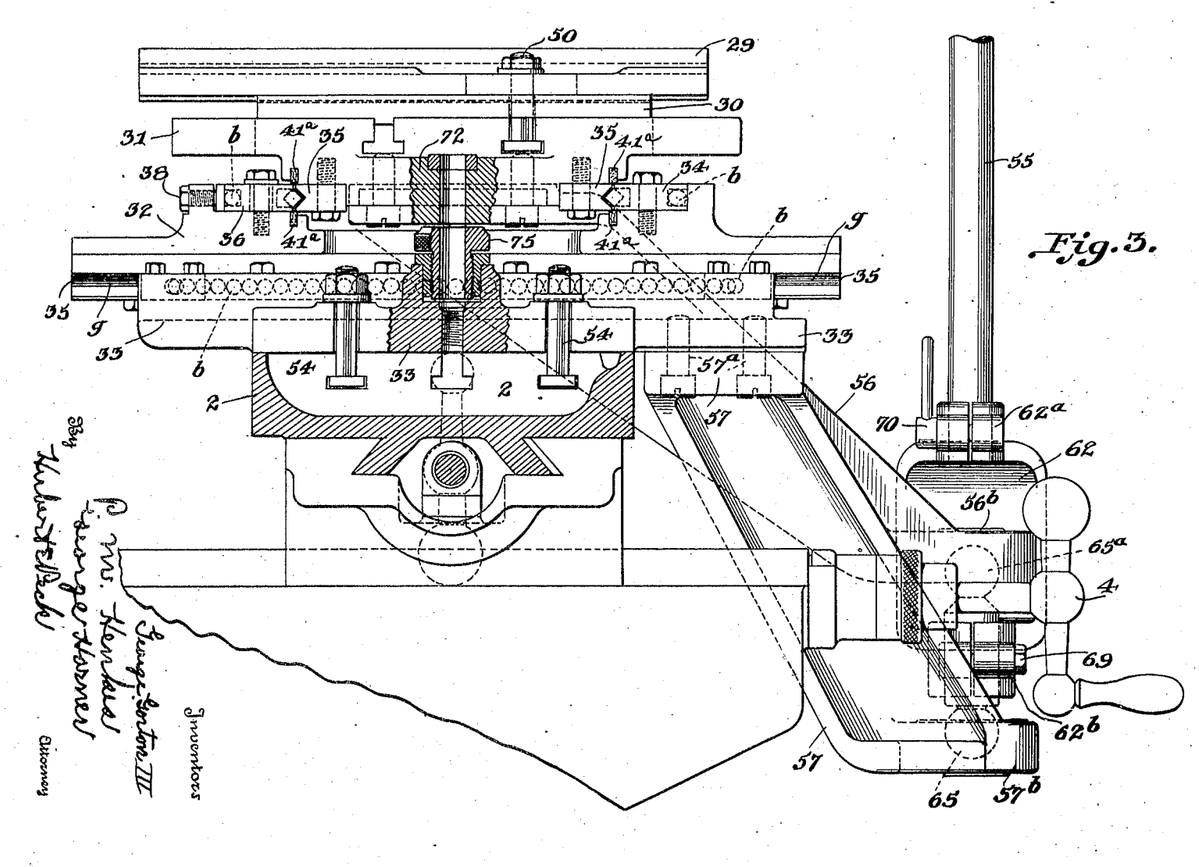
Fig. 3 is an end elevation of sensitive table and its controlling means, and the milling machine work support, partly in vertical section, the frame not being shown.
Figures 4, 16:
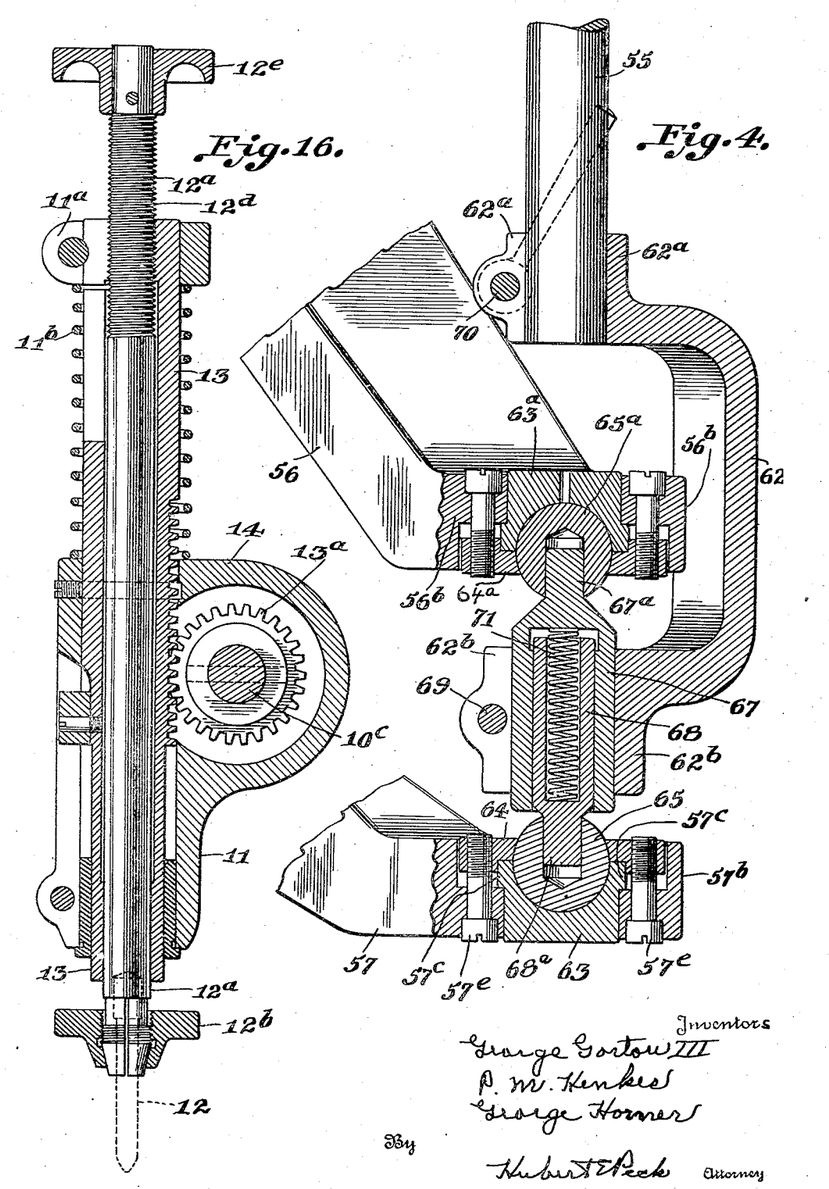
Fig. 4 is a detail view partly in vertical section of the universally laterally swingable upright sensitive table moving and controlling lever, the push and pull arm therefrom to the table and the fixed arm supporting arm for said lever, being partially broken away.
Fig. 16 shows the tracer stylus head in part, in longitudinal vertical section.
Figure 5:
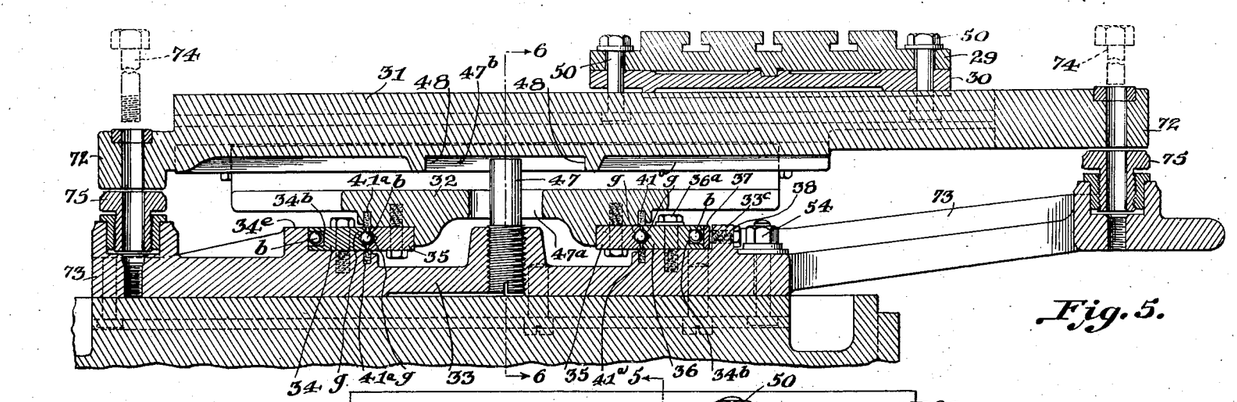
Fig. 5 is a vertical longitudinal section of the combined work and pattern sensitive table and its mountings, the milling machine work table being shown in part, the section being taken on the line 5—5, Fig. 6, the bolts for locking the top table to the base being indicated by dotted lines.
Figure 6:
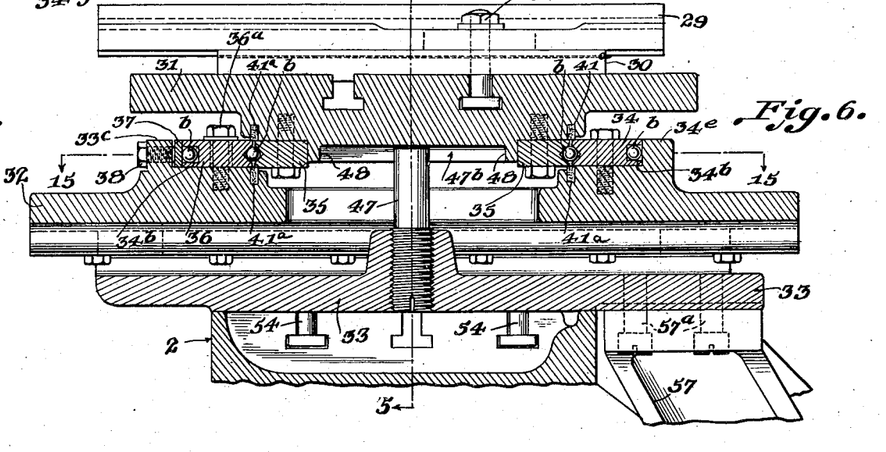
Fig. 6 is a vertical section on the line 6—6, Fig. 5.
Figure 7:
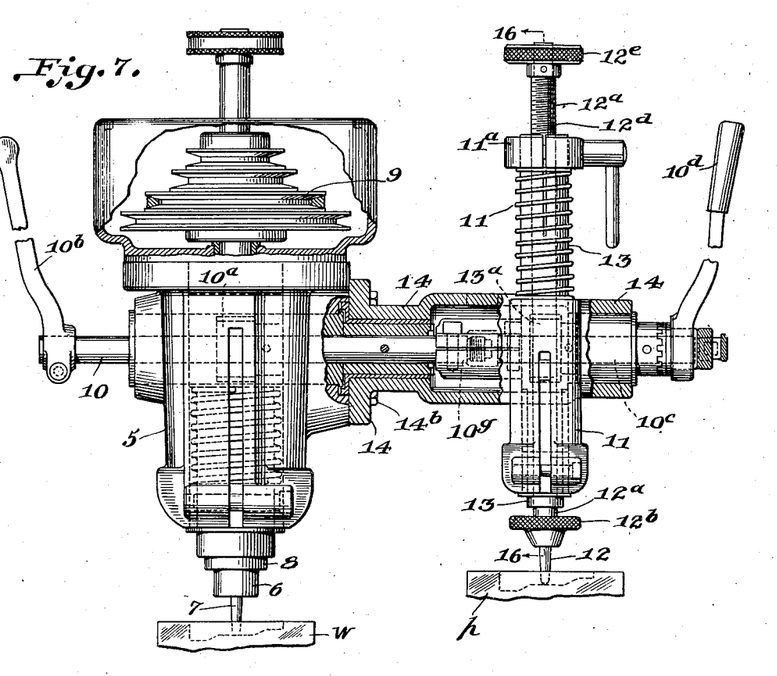
Fig. 7 is a detail front elevation of the cutter and tracer stylus heads, partially in vertical section, the work and master pattern being diagrammatically indicated.
Figure 8:
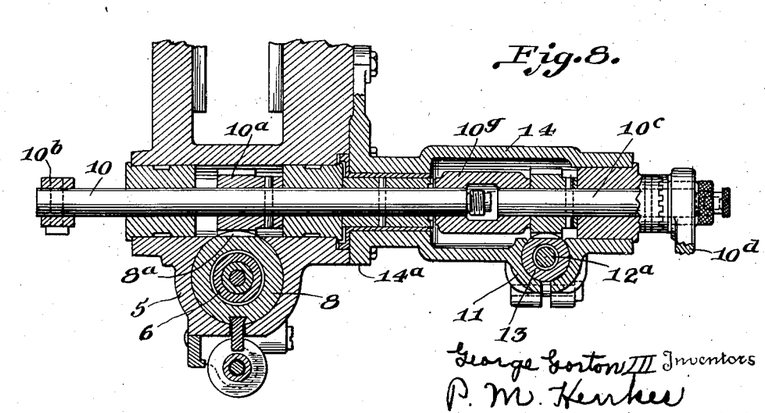
Fig. 8 is a detail horizontal sectioned view of the organization shown by Fig. 7.
Figure 9:
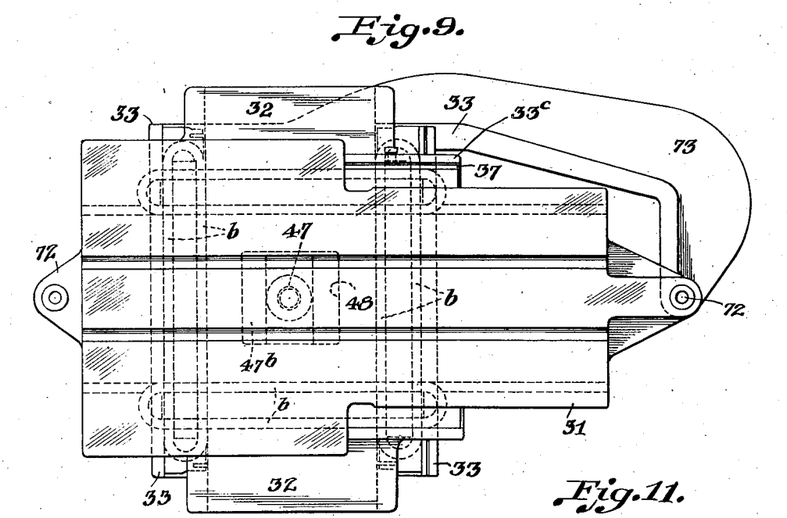
Fig. 9 is a detached detail top plan of the top or combined work and pattern table and its mountings, namely, the base and saddle, the several endless processions of bearing balls being indicated by dotted lines, the top table being shown in its central position.
Figures 10, 11, 12, 13, 14:
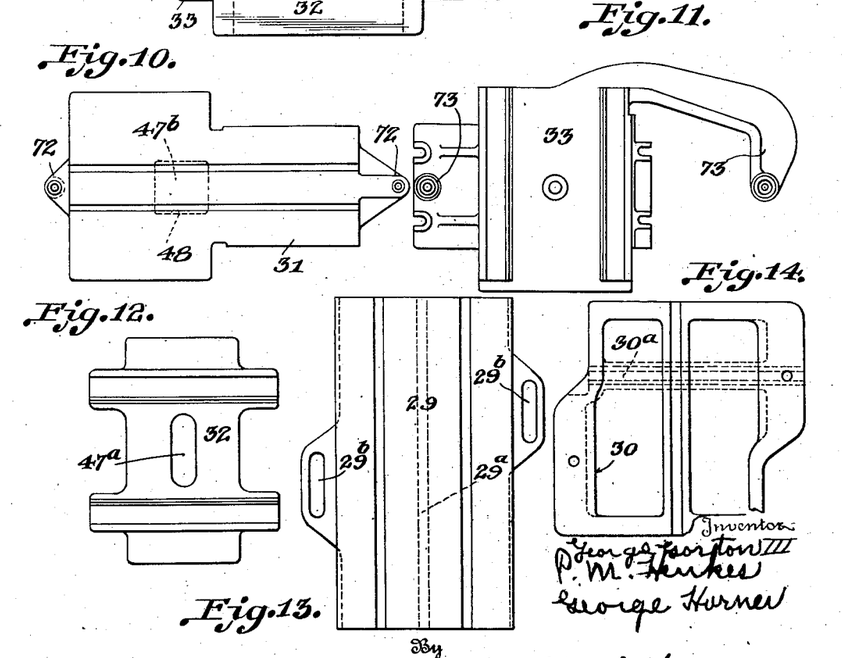
Fig. 10 is a detached top plan view of the top table without its bearing rails.
Fig. 11 is a detached top plan view of the base of the top table mountings without the bearing bars.
Fig. 12 is a detached top plan view of the saddle of the top table mounting, without the bearing rails and bars.
Figs. 13 and 14 are detached top plan views of the upper and lower plates, respectively, that can be employed on the top table for setting and adjusting the master pattern with respect to the stylus and with respect to the work blank fixed on said top table.
Figure 15:
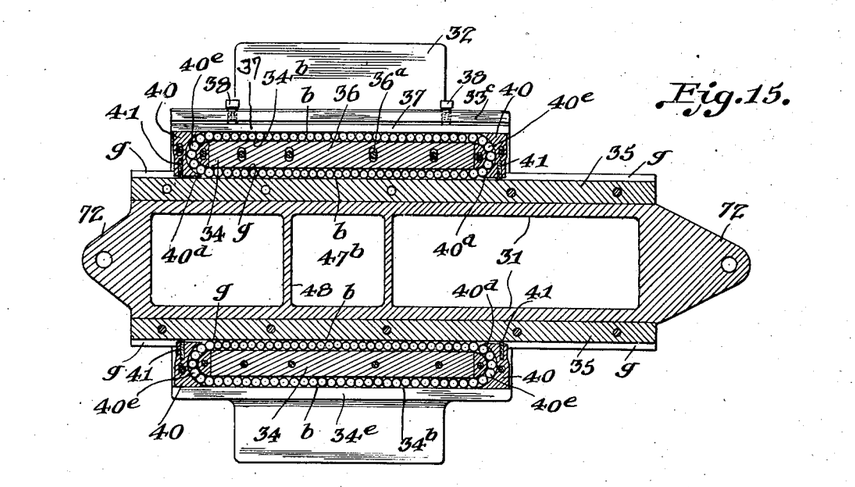
Fig. 15 is a detail, more or less diagrammatical horizontal section through the top table and end portions of the saddle showing the two parallel endless processions of travelers, such as balls supporting said table from and confining the same to said saddle, and the two sets of bearing rails and bars, with the bars forming the endless runways or circuits to which the balls are confined and in which they travel.
Figure 17:
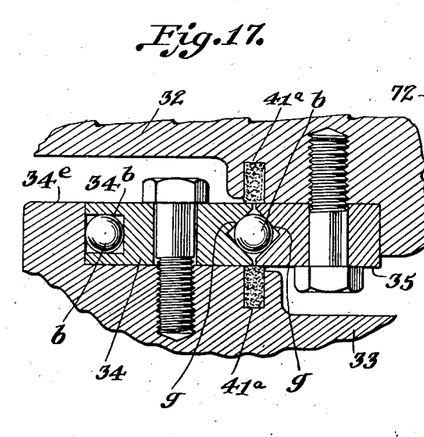
Fig. 17 is a detail cross section taken on the line 17—17, Fig. 18.
Figure 18:
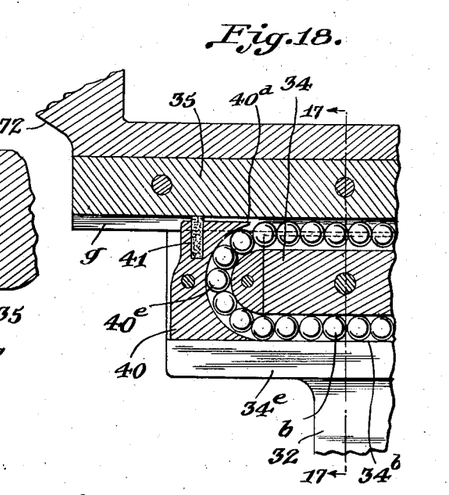
Fig. 18 shows a portion of the structure illustrated by the horizontal section Fig. 15, on an enlarged scale.

In the drawings, we show a machine tool of the vertical cutter spindle milling, routing, or the like type, say, a machine of the characteristics of the disclosure of the George Gorton Patent, No. 1,862,052, dated June 7, 1932, with our instant invention adapted thereto and included therein. We do not, however, wish to so limit our invention, as we wish to cover the same in any machine to which it can be adapted and/or in which it can be embodied for the purposes of our invention, whether or not the machine cutter head is carried by a sliding support or otherwise.

The milling or other machine, illustrated merely as an example, embodies a main frame or pedestal 1, supported by any suitable base, and at the front provided with any suitable vertically adjustable knee carrying the standard or any suitable work table 2, so supported in the usual or any other suitable manner, as to be adjustable forwardly and rearwardly by suitable feed means having front actuating handle 3, and to be endwise adjustable by suitable feed means actuated by the handle 4.

Above the said work table, the frame supports a suitable cutter head 5, which can be of conventional design and organization, although we happen to show a cutter head provided with a vertical rotary cutter spindle 6, depending therefrom and at its depending end equipped with a suitable chuck or collet to operatively hold and drive an alined rotary milling or other suitable cutter 7, with this cutter spindle mounted and rotatable in and carried longitudinally by a suitable slide or quill 8, carried by and slidable in the cutter head. The spindle can be driven by any suitable drive, such as a belt drive including an endless belt driven pulley 9. The cutter head can provide any suitable depth stop mechanism to control or set the working depth of the rotary cutter 7, and with a spring to approximately balance the weight of the slidable quill and rotary cutter spindle carried thereby, and feed means for raising and lowering the quill and its cutter spindle. As for example, without so limiting ourselves, the cutter head, quill and spindle, can be equipped with depth stop means, a spring for approximately balancing the weight of the quill and its load, and feed means such as illustrated by the hereinbefore mentioned patent, and George Gorton Patent No. 1,889,653.

We show the quill carrying the rotary cutter provided with feed means embodying a toothed rack 8a rigid with and extending longitudinally of the quill and a rotary cross shaft 10 extending transversely through and beyond and mounted in the cutter head housing, and therein provided with a pinion 10a, fixed to the shaft and in constant mesh with said rack. At its projecting left hand end this shaft is provided with a forwardly extending radial handle 10b, by which the operator can control the elevation of the cutter and hold the same down to its work.

In the particular example illustrated, we show a tracer spindle head 11, in fixed spaced relation to the cutter head 5, and providing a vertical tracer stylus 12, and its alined carrying spindle 12a parallel with the cutter and its spindle and spaced a normally fixed distance therefrom, and simultaneously movable therewith in such manner that when the cutter is moved longitudinally toward and from the work by its feed mechanism, the tracer will be simultaneously and correspondingly moved longitudinally toward and from the pattern that is to be reproduced in the same size by the cutter.

The tracer spindle 12a, is at its lower end equipped with any suitable chuck or collet for removably receiving and holding the depending tracer stylus 12, in operative position alined with the spindle. For instance, the tracer spindle 12a, can be longitudinally socketed and split at its lower end to interchangeably receive various sizes and forms of tracing stylus, and provided with rotary collet clamp 12b, screw threaded on the collet-forming lower end of spindle 12a, for locking and releasing the stylus by contraction and expansion of the collet.

The tracer spindle 12a, extends longitudinally through and is carried by a sleeve or quill 13, with the spindle projecting beyond and downwardly below said quill. The spindle is adjustable longitudinally of and within the quill to set the tracing stylus at the required elevation with respect to the pattern and the rotary cutter 7. The spindle is longitudinally and externally screw threaded, 12d, and this spindle thread is in mesh with an internally longitudinally threaded upper end portion of the bore of said quill, whereby the spindle is supported in and rendered adjustable longitudinally of the quill. The upwardly extending end of the spindle is provided with handle 12e, for rotating the same during vertical adjustment.

A vertical head or housing 11 is provided for said tracing stylus organization just described.

The quill carrying the tracer stylus spindle is carried by and slidable longitudinally in the bore of the fixed vertical head or housing 11, and depends therefrom and projects upwardly thereabove. A coiled expansion spring 11b, loosely surrounds and extends longitudinally of the quill above and seating on the upper end of the head. The upper end of this spring abuts a clamp collar 11a, normally rigid with the upper end of the quill. This spring serves to approximately counterbalance the weight of the quill and spindle, to facilitate the feed and return longitudinal movements of the quill and its load.

Means are provided to feed the tracer stylus and its supporting spindle and quill, in this instance similar to the rotary cutter feed means, with common transverse rotary shaft means for simultaneously raising and lowering the cutter and stylus.

For longitudinally moving and holding the stylus, we provide a geared operative connection 13a, between the transverse shaft 10c, and the quill 13, and this general connection consists of a longitudinal rack rigid with the quill and a pinion rigid with said shaft and meshing with the rack. The transverse shaft section 10c, at its projecting end (the right-hand end in the drawings) is provided with an exposed forwardly extending crank handle 10d, by which the shaft can be rocked.

In the particular example illustrated, the left-hand end of shaft section 10c, is coupled to the right-hand end of the cutter feed shaft 10, to rotate therewith, the two shafts being axially alined. These two shaft sections 10, 10c, are operatively connected by any suitable detachable or separable coupling 10g, which need not be shown and described in detail, as specifically it constitutes a separate improvement apart from our instant invention.

In the particular machine shown as a mere example of one embodiment of the instant invention, the tracer stylus head and the sensitive table and its controlling means are disclosed as removable attachments applied to a vertical milling or routing machine, without intending to so limit the invention.

The tracer stylus head, in this example, is removably normally fixed to and supported from and carried by the cutter head housing 5. The present example shows the vertical tubular head 11, for the tracer spindle and its quill rigid with and supported by a transverse horizontal tubular case or housing 14, opening into and arranged tangentially of head 11, and housing and providing the supporting bearings for the transverse feed shaft section 10c, and the separable coupling between shafts 10 and 10c. The left-hand or inner end of this transverse housing 14 is formed with a surrounding exterior base flange 14a, abutting the right hand vertical wall of said head 5, around the projecting end of feed shaft 10, and the tracer stylus head is removably secured to and supported from head 5, by suitable securing bolts 14b, removably passed through said flange 14a, and into head 5.

When the tracer stylus head is thus operatively fixed to the milling machine in the required normally fixed position relation to the cutter head 5, the rotary cutter and the parallel non-rotary tracing stylus can be simultaneously raised or lowered by either crank handle 10b, 10d. When the milling machine is not to be used for duplicating purposes and if the presence of the tracing stylus head is then undesirable, the tracing stylus head can be removed from the machine, by removing bolts 14b, and adjusting the separable shaft coupling to permit separation of shaft 10c, from shaft 10.

We provide a single platen or work and pattern table to which both the pattern and the work are secured in fixed relation to each other, and also in fixed operative relation to the rotary cutter and the tracing stylus, respectively, and this work table is mounted for universal lateral movement under the control of the operator, in a plane perpendicular to the parallel axes of the rotary cutter and the stylus. This table is, preferably, so supported and mounted as to be freely movable laterally in all directions under propulsion by the operator, to be thereby sensitive, requiring exertion of minimum effort on the part of the operator to shift the table laterally. Hence, we prefer to mount the table on rolling travelers, such as balls or rollers, preferably arranged in variously positioned endless series to travel in annular or endless confining runways.

The table is under the manual control of the operator, preferably from a single station or operating member having a sturdy power-multiplying operative connection with the table. In performing the pattern duplicating work for which this machine is particularly designed, particularly where the pattern is to be duplicated full size, i. e., where the duplicating ratio is one to one, very substantial power or force is required to hold the work in steady, accurate operative relation to and against the high speed rotary cutter and the lateral thrust thereof, and hence, we find it to be desirable to provide approximately a five to one, more or less, leverage or other power multiplying operative connection from the manual control or operating member to the sensitive table, although we do not wish to thus limit ourselves to any particular power increasing operative connection, nor do we wish to limit the broader features or scope of our invention to the particular power multiplying leverage disclosed.

In the example shown, we provide a single strong, rigid, elongated horizontal work table 31, arranged below the vertical rotary milling or other cutter, and the vertical tracing stylus, and the work w, is arranged above and rigidly clamped down on this table by any suitable means, in proper operative relation to and below the cutter, and the pattern p, is arranged above the table and is rigidly clamped thereto in operative relation to and below the stylus.

In this particular example, the work table 31 is removably mounted on the ordinary, or other suitable vertically adjustable milling machine table 2, which is adjustable longitudinally and forwardly and rearwardly, as hereinbefore described.

In this particular example, the table 31 is supported through the medium of a fixed base or platen 33, removably yet fixedly resting on and bolted or otherwise clamped to the milling machine table 2, and on intermediate plate, platen or saddle 32, supported on and confined to the base 33, to limited straight-line movement with respect thereto, with the top table 31 supported on and confined to the saddle to limited relative straight-line movement perpendicular to the path of straight-line movement of the saddle on the base, in such manner that simultaneous straight-line movements of the saddle carrying the top table 31, with respect to the base, and of the table 31 with respect to the saddle, permits universal lateral movements of the top table in any direction. In this example, the saddle is confined to straight forward and rearward movements on the base during which it carries the top table and the top table is confined to the saddle against any relative movement with respect to the saddle other than straight line longitudinal movements, i. e., straight-line movements perpendicular to the path of movement of the saddle on the base.

The saddle is confined to and supported from the base, in this example, by two separate horizontal parallel endless series of identical rolling travellers, such as balls b, each series confined to travel in its own endless raceway. In the example shown, the top plate or table 31, is confined to and supported on the saddle by two separate horizontal, parallel endless series of identical rolling travellers, such as balls b, each confined to travel in its own raceway. The endless series of travellers b confine the table 31 to straight-line movement relatively to the saddle in directions parallel to the longitudinal lines of travel of the endless series of balls b, while carrying the table with the saddle when the saddle moves laterally or transversely with respect to the path of said straight-line movement. When the saddle thus moves laterally with the table 31, the saddle is confined to a straight-line path of movement with respect to the base, by the series of endless travellers b, that support the saddle and its load (table 31) on the base and confine said saddle to relative straight-line movement that is perpendicular to path of straight-line movement of the table 31, with respect to the saddle and the base.

The table 31, being thus carried by rolling supports, is exceedingly sensitive and can be universally and freely moved in any direction, within its range of horizontal movements, by slight effort.

Any suitable means can be provided to limit the range of horizontal movements of the table 31, although, as an example for this purpose, we show a rigid, vertical, elongated stud 47, screwed in or otherwise fixed to and upstanding from the central portion of the base 33, and extending upwardly through an elongated slot 47a, in the saddle 32, preferably without contacting the saddle, with the rigid free upper end of said stud located within a bottom recess or upward depression 47b, in bottom of the table 31, bounded by a surrounding annular horizontal edge wall 48, rigid with table 31, and adapted to abut the upper end of stop stud 47, and thereby limit the relative horizontal movements of the table to the area surrounded by said annular abutment wall 48. In this instance, said annular wall is approximately square or rectangular, but our invention is not so restricted.

As an example of a manual control having movement-reducing and power-increasing operative connection with table 31, from among others within the spirit and scope of the instant invention, we show a single control station or operating member in this example formed by the free upper handle end of an elongated upstanding strong, rigid, approximately straight lever 55, at its lower end fulcrumed to a depressed supporting member 57, that is fixed and rigid with respect to the movable table 31, and its saddle 32, all in such manner that the lever 55, is universally swingable laterally in all lateral directions, and this lever has operative power-increasing push, pull and holding connection with the table 31, to move the same in the direction the lever is swung.

In this example, the long, upstanding lever 55 is arranged at the right-hand side of the machine, with its upper handle end within convenient reach of the operator's right hand, while he occupies the operator's position or stand in front of the machine with his left hand controlling the cutter and stylus feed through his grasp of feed lever 10b, and with the work and pattern and the rotary cutter and stylus clearly visible immediately in front and within his convenient range of vision.

The supporting fulcrum of lever 55 is in this example depressed to an elvation slightly above the floor level, if so desired, and is provided for by a fixed strong supporting arm 57, secured to and supported by some relatively fixed part of the machine with respect to the table 31 and its saddle. For instance, we show the upper end of supporting arm 57 at its upper surface fitting the under side of the right-hand end of base 33, and normally rigidly secured thereto by bolts 57a, with the arm inclined downwardly therefrom toward the right. The depressed free or lower end of this arm is arranged horizontally and the lower end of the lever rises therefrom and is coupled thereto by a universal joint or ball and socket connection to provide the lever fulcrum.

For instance, we show the depressed end of the rigid supporting arm in the form of a rigid horizontal annulus 57b, having a vertical bore. A step bearing block 63, having a central top semi-spherical bearing depression or seat and an annular exterior supporting flange 57c, is seated down in the bore of annulus 57b, with its flange supported on a shoulder of the annulus. A ball 65, carried by the lever 55, and depending from the lower end thereof, in alinement with the lever longitudinal axis is complementary to said semi-spherical bearing depression of block 63, and is seated therein. The ball 65 is confined in the depression in sliding rotating contact with the surface thereof, by cap ring 64, secured down on annulus 57b, by bolts 57e, to slidably embrace the ball 65, above its horizontal diameter, whereby the lever fulcrum is such as to permit universal lateral swing of the lever.

In this particular example, it so happens that we provide the lever 55, with a rigid strong end yoke, head or extensions 62, the upper end of which provides a rigid split clamping hub 62a, in which the lower end of the strong stiff upper length 55 of the lever is rigidly clamped. The hub 62a alined with the longitudinal axis of the lever is provided with clamping bolt 70.

The lower end of the lever extension or head 62, provides an elongated hub 62b that is longitudinally alined with upper hub 62a, although spaced a considerable distance downwardly therefrom. This lower hub 62b is longitudinally split to form a split clamp and is provided with clamping bolt 69.

The casting or other strong rigid member, ycke or head 62, is offset laterally between its alined end hubs 62a, 62b, to provide ample space between said hubs, for reception of the coupling means that operatively connects the laterally swingable lever with a push and pull connection with top table 31.

In this example, said connection embodies a stiff strong metal arm 56, fitting the under side of the projecting right hand end of table 31 and rigidly secured thereto by bolts 56a, with the rigid arm depending from said table clear of lever supporting arm 57, and extended toward the right and with the lower end of arm 56 terminating in a rigid strong horizontal annulus 56b, located in the space between hubs 62a, 62b, in longitudinal alinement therewith and spaced from both and from the offset portion of yoke 62.

This annular 56b is operatively coupled to the lower end portion of lever 55, 62, by any suitable universal or ball and socket coupling or connection, in this example, similar to the ball and socket coupling between annulus 57b of supporting arm 57, and the lower end of said lever that provides the lever fulcrum. For instance, the lever operatively carries a spherical ball 65a, longitudinally alined with the fulcrum ball 65, and arranged a distance above the same. The annulus 56b, of push and pull arm 56, carries a step-bearing block 63a in normal fixed relation therein having in its lower end a semi-spherical downwardly opening bearing socket in which the upstanding ball 65a is operatively confined by the annular cap ring 64a, all as hereinbefore described with respect to block 63, ring 64, and ball 65.

The operative power transmitting coupling from the lever 55, 62, to the table 31 through stiff push and pull arm 56 thereof, is, in this particular example, arranged within the offset yoke or head 62, of the lever in the space between the upper and lower alined hubs 62a, 62b, and the work or power applying arm or length of the lever, is the relatively short distance along the longitudinal lever axis, from the center of the fulcrum or lower ball 65, to the center of the upper ball 65a.

These two balls can be operatively coupled to the lever against relative radial movement transversely of the lever longitudinal axis, in any suitable manner or by any suitable means, although in this particular example, we show the upper ball 65a, formed with a downwardly opening radial socket into which an upstanding strong metal stud 67a is fixedly driven or otherwise secured. The rigid depending shank 67 of this stud forms a longitudinally elongated hollow downwardly-opening tube or cylinder that depends longitudinally through and is rigidly clamped in the split-clamp-forming hub 62b, rigid with the lower end of the offset head or yoke 62, of the lever 55. The lower or fulcrum ball 65 is similarly fixed on a strong rigid upstanding stud 68a, longitudinally alined with the stud 67a, and its ball 65a. The upstanding strong shank 68, of the stud 68a, forms an upwardly opening tube or cylinder longitudinally alined with cylinder or tube 67, and snugly fitted therein in longitudinally slidable engagement. A coiled expansion spring 71 is preferably compressed in the tube 68, between the closed lower end thereof and the closed upper end of tube 67 to approximately balance the weight of stud 67, 67a, and the load thereon, as the longitudinal distance between balls 65, 65a, varies slightly during the lateral swinging movements of the lever from the lever fulcrum center at a fixed location. This variation in the longitudinal length of the distance between said balls is compensated by the longitudinal relative sliding movement between the telescoped shanks or bodies of studs 67a, 68a.

It will be noted that the power or hand lever 55, 62, in this particular example constitutes in effect, an elbow lever, having the very long arm 55, 62, to the fulcrum 63, 65, and the very short arm 65, 67, 68, 69, which in this instance, is longitudinally alined with the lever arm 55, providing an exceedingly compact, rugged, powerful and advantageous organization. However, it is also noted that the broader aspect of our invention is not concerned with any specific lever arrangement, mounting and connections. It is also noted as within our invention, that the relatively fixed fulcrum support can be formed by the annulus or hub 55b, to constitute ball 65a, as the lever fulcrum, and the arm 56, can be substituted for the arm 57, to operatively connect the ball 65 with the sensitive table 31, to actuate the same on its lateral movements.

We can, if so desired, vary the power multiplying leverage of the manual control member 55, etc. on the sensitive table, by employing lever lengths 55, of different lengths, as the lever length 55 is removable and replaceable through the medium of split clamp socket 62a, rigid with the lever yoke or head 62.

Where the machine of our invention is employed to reproduce work of the same size as the pattern, we prefer to employ a power multiplying lever of about 3 to 1 to 6 to 1, to give the operator the required power or leverage over the rotating cutter when at work, to hold the table and work steadily and accurately and to maintain easily absolute control over the table.

The sensitive table 31 is longitudinally elongated with respect to the saddle and base, to provide the elongated right hand portion, in this particular instance, on which the master pattern can be fixedly located under the stylus. The table is, preferably, provided with the usual top longitudinal T-slots to receive and permit adjustment of headed bolts for clamping and holding articles on the table top, although other means are possible for this purpose.

The work is clamped on the main portion of the table 31, above the saddle and base, and in operative position under the rotary milling cutter.

Where it is desirable to mount the master pattern on the extended portion of the flat-top table 31, in an elevated position, say, approximately as shown in the drawings, we gain advantages by employing separate approximately flat plates, for instance, such as 29 and 30. The bottom plate 30, can removably rest flat on and parallel with the top surface of table 31, and can be adjusted longitudinally thereof and clamped rigidly thereto by upright headed bolts 50 fitted and slidable in the T-slots of the table, and passing upwardly through bolt holes in said plate. The plate 29 can rest removably on the top face of the plate 30 and removably interlocks with plate 30 through the medium of transverse straight groove 30a in the top of plate 30 and complementary rib 29a, at the bottom of plate 29. This transverse tongue and groove interlocking between said plates, centers plate 29 on plate 30 against relative longitudinal movement, permitting relative transverse adjustment of plate 29 when its clamping bolts are released. The plate 29 has projecting end ears 29b longitudinally slotted for the removable reception of bolts 50, with the nuts on said bolts adapted to screw down onto said ears to clamp the two plates together and to the table to rigidly hold the two plates in the desired adjustment. The plate 29 can be formed with the usual top T-slots for adjustment of the bolts exployed to operate any ordinary or suitable clamping means employed to rigidly hold the master pattern on plate 29, in the desired position with respect to the fixedly located work blank, and the stylus.

These interlocking plates 29, 30 and their adjustments provide an exceedingly simple and convenient means for lining up and adjusting the master pattern with respect to the work blank previously fixedly located on the table, and for then fixedly securing the pattern in the required position. However, we do not wish to restrict other features of our invention, to any particular means for securing and/or adjusting the pattern on the table.

For ordinary duplicating work, the working end of stylus 12 should be of the same diameter and of the same point shape as the rotary milling cutter 7. Where the surface of the work after it has been cut to duplicate the pattern requires a finishing cut to remove stock to a depth of several thousandths of an inch, the stylus 12 employed on the original duplicating cut should be about one-hundredth of an inch larger in diameter than the rotary milling cutter employed to oirginally cut the work to form duplicating pattern.

When both the work blank and the pattern have been secured to the one table 31 in the desired fixed relationship in readiness for the duplicating operation, the milling machine table is adjusted to bring the table 31 up to the desired elevation required for the duplicating operation. The rotary milling cutter and the stylus are then fed down by handle 10b, to the operative level with respect to the work blank and the pattern, at which the cutter must begin its duplicating operation. The stylus is then adjusted vertically to agree with the difference in level between the top of the pattern and the top of the work where the cutter must start in on its cutting operation. The stylus is adjusted vertically by screwing its spindle 12a by means of its handle 12e, upwardly or downwardly in and relatively to its quill or barrel 13. When the proper adjustments have been made, the cutter is connected with its driving power, and the operator by handle 10b, simultaneously feeds down both the cutter and stylus as the work progresses, and by the power multiplying lever 55, the operator shifts the table to constantly maintain the work steadily and accurately against the rotating cutter and the pattern accurately and steadily against the stylus, so that as the pattern moves in any and all lateral directions against the stylus, the work will correspondingly shift and be correspondingly held against and into operative relation to the cutter and against the resistance thereof. The lever 55, is freely and universally movable laterally, and with a great power multiplying leverage freely moves the table 31 laterally in corresponding universal directions to bring all portions of the work to be operated on against the cutter and all portions of the pattern to be duplicated against the stylus, and to thus hold the table steadily and accurately against the resistance of the high speed milling cutter. The production of work in full size duplication of patterns, can be, by the machine of our invention, carried on with speed and accuracy and marked economy.

Where a milling or like machine is equipped with the embodiment of our invention, generally as disclosed by the drawings, it is possible to preliminarily rough out the work blank preparatory to the duplicating operation, without bringing the sensitive table movement, and the pattern and stylus, into action. In thus using the milling cutter without the duplicating machine features, we temporarily lock the sensitive table to its base 33 against relative movement and depend on the ordinary milling machine table feeds, operated by handles 3, and 4, to shift the table 31, having the work blank fixed thereon to cause the milling cutter to perform the desired roughing out cutting of the work. The base 33 of our sensitive table is fixed to the ordinary work table of the milling machine, and for this roughing out operating, we thus fix our sensitive table to the milling machine table against relative movement, and then depend on the milling machine hand screw feeds for bringing the work to the cutter.

When it is desired to begin the duplicating operation, the sensitive table is released from its base, and thus left free for its universal lateral movements, with respect to its base and the milling machine table, under the power and control of the universally laterally swingable hand lever 55. Various means and/or arrangements can be provided for thus temporarily locking the table 31, against relative movement with respect to its base or with respect to the milling machine table, and for releasing said table for its free duplicating movements. As an example, we show the table ends formed with projecting rigid eyes 72, through which removable bolts 74 can be passed, and screwed into complementary vertical bolt holes in the free ends of arms 73, rigid with the base 33 and projecting outwardly therefrom. When the table is moved to bring the eyes 72, into registration with said bolt holes of arms 73, the bolts 74, can be dropped into place through the eyes and screwed into the bolt holes to lock the table to the base. The bolts can be as easily unscrewed and removed to release the table from the base for relative movement. The locking action can be assisted by annular vertical threaded nuts 75, screwing into threaded sockets in the ends of arms 73, longitudinally alined with the threaded bolt holes. The bolts drop through these annular nuts. These annular nuts are adapted to be rotated to abut their upper ends tightly against the under surfaces of the eyes 72 when the bolts are in table locking position, to aid in the locking action. This is the abnormal position of said nuts. When the bolts are removed, the nuts are rotated to their normal depressed positions with their upper ends free of the table 31.

The particular embodiment disclosed, provides the tracer stylus head and its mountings as an attachment for a standard vertical milling machine or for any other suitable machine tool to which it can be adapted, whereby said attachment can be as a unit, secured in operative relation to the machine cutter head, and can be as a unit removed therefrom, as hereinbefore described.

The sensitive table and its mounting and manual control and operating means are also disclosed as an attachment for such machine tools, whereby such attachment can, as a unit, be applied in operative relation to such machine, and can be as a unit removed therefrom.

The operative relations between the sensitive top table 31, the saddle 32, and the base 33, are maintained by the stop means and by the rolling bearings by which said members are mounted one on the other and held together in operative relationship. The power multiplying lever 55 and its operative connection with the top table is maintained by the lever supporting arm 57 fixed to the base 33 and also coupled to the lever, and by the stiff push and pull arm 56, fixed to the top table 31, and also coupled to the lever. The table and its operating means thus, in this example, constitute a unit for attachment to and removal from the milling or other machine for cooperation with the cutter and tracer stylus heads when arranged on said machine in cooperating relationship. In this embodiment the base 33 is adapted to removably fit on the standard or other work table 2, of the milling machine and to be rigidly clamped thereon by any suitable means such as the removable vertical bolts 54, the heads of which are held by and in the common T slots of the milling machine table. These bolts can be adjusted longitudinally of table 2, in said slots, and are here shown extending up through slots or bolt holes in the base ends with their top nuts screwing tightly down on the base ends to clamp the base to the table 2. The table and its operating lever organization, will thus be operatively secured to and supported by the table 2. The arms 56, 57 and the lever 55, are supported from and carried by the sensitive table organization.

We do not, however, wish to restrict our invention as an attachment, as it can be built in as a part of a duplicating machine or complete organization for carrying out the purposes of our invention.

We do not wish to limit the general or broader aspects of our invention to any particular or specific means or mountings for table 31, to render said table universally movable laterally under the control of a single member having power multiplying operative connection, with sufficient freedom for the purposes of our invention. However, we have devised and disclose what we believe to be unique, rolling bearing mountings carrying this table, that are highly advantageous in cooperating to carry out certain purposes of our invention. For instance, the saddle 32 is confined to and supported from the base by several cooperating bearing sets or pairs, each consisting of a relatively short normally stationary strong straight bar or rail 34 or 36, and a relatively long straight parallel rail 35 that is normally longitudinally movable with respect to its complementary bar 34, or 36. The bar and its complementary rail are in a common horizontal plane, with the rail rigid with and arranged transversely of the saddle, and the bar rigid with and arranged transversely of the base and in this instance, by transversely is meant from front to rear. The approximately meeting, longitudinal, parallel edges of the bar and rail provide vertically wide edge walls similarly grooved throughout their lengths by V grooves $g$, preferably right annular in cross section. These complementary approximately meeting grooved edges form a long straight ball retaining race-way for a straight row of balls $b$.

The two facing identical grooves $g$ of the cooperating rail and bar are of such form and depth with respect to the diameter of the spherical balls $b$ retained thereby that the balls are loosely confined by and between the rail and bar, with the balls extending equal distances into the same, whereby the rail and bar support and confine the balls and whereby the balls constitute the supporting medium between the rail and bar when one is rigid with an upper carriage such as the saddle 32, and the other is rigid with a lower member, such as the base 33, and the upper member such as the saddle is thereby supported from the lower member such as the base.

As a convenient, satisfactory arrangement, we show the saddle 32 supported on and confined to the base 33 by two parallel sets of the complementary rail and bar and their interposed row of balls, arranged in a common horizontal plane, with the two sets spaced apart and arranged under the opposite end portions of the saddle and extending transversely of the saddle from front to rear.

In this arrangement, the long, strong, straight, rigid rails 35 of each set are rigid with, as by being bolted to, the under side of the saddle 32, and hence, support the saddle and its load, and travel with the saddle, and confine the saddle to its straight line path of movement, in this instance, forwardly and rearwardly. The relatively short and normally stationary complementary bars 34 and 36 are carried by the base and normally rigidly fixed to top portions thereof by suitable bolts, in the same horizontal plane as the parallel, long, longitudinally movable rails 35, with the straight long raceway forming edges of the bars 34, 36, operatively located and arranged with respect to the complementary raceway forming edges of the respective rails 35, to operatively receive and retain the two rows of balls $b$.

It will thus be noted that the balls support the saddle and its load and couple the saddle and base together and confine the saddle to its straight line path of movement, all through the medium of the sets of complementary rails and bars and their grooved edges.

The top table 31 is by similar means supported by and confined to the saddle 32, but is confined to a relative straight line path of movement longitudinally of the table and transversely of the saddle and perpendicular to the straight line forwardly and rearwardly path of movement of the saddle on the base, bearing in mind that the table propelling and directing power is applied direct to the table and that the saddle is propelled on its straight line movements through the medium of the table.

For example, as in the bearing supporting coupling between the saddle and base, two sets of bars 34, 36 and rails 35 are provided between the table and saddle arranged between the front and rear portions of the table and the end portions of the saddle with the exception that these rails and bars extend longitudinally of the table and saddle at right angles to the lengths of the rails and bars between the saddle and base.

We show the same kind of parallel long, straight horizontal grooved rails 35, as before described, rigidly fixed to the under side of the table 31, as by bolts, and parallel long, straight bars 34, 36, normally fixed to the top side of the saddle, as by bolts, with the several rails and bars in a common horizontal plane and with their raceway forming grooved edges approximately meeting and loosely confining the rows of balls $b$, as hereinbefore described, to function with respect to the table and saddle as before described in connection with the saddle and base, the balls being located within the common horizontal plane of the bars and rails.

To take up wear and resulting possible objectionable lateral play between the table and saddle and between the saddle and base, any suitable tightening or adjusting means can be provided. For instance, we show one of the bars, for instance bar 36, between the saddle and base, and bar 36, between the table and saddle, bodily adjustable transversely of its length, to reduce the distances between each set of grooved edges.

For instance, the bar 36 rests on the flat top face of a rabbeted top portion of the base, that forms a longitudinal upstanding wall 33c. The long bar 36, rests on said flat face, and is normally rigidly clamped against the same by a series of bolts 36a extending through somewhat elongated bolt holes in the bar, and screwing into tapped screw holes in the base. On loosening the bolts 36a, the bar can be moved bodily transversely toward its complementary rail 35, fixed to the saddle and this will slightly shift the saddle, and thereby shift the other rail 35, carried by the saddle toward its complementary bar 34, the result being to thereby slightly reduce the width of the raceways in which the two ball rows are arranged. After the adjustment, the bolts 36a are again tightened. The adjustment can be readily effected and maintained by a gib 37 interposed between and parallel with and abutting the inner straight edge of the bar 36, and the inner abutting ends of a series of set or stop screws 38, threaded through a series of tapped screw holes in the wall 33c.

This same provision for adjustment and setting of the bar 36 carried by the top of saddle 32, is shown, for tightening the bearings between table 31 and saddle 32.

In this particular embodiment, the bearing rails 35 are relatively longitudinally movable with respect to the complementary bars 34, 36, and each row of balls between a rail and a bar, forms a length of an endless procession, chain or series of identical travelling balls, and each bar 34, 36, and means forming parts thereof provide or complete a confining endless runway or circuit in which the procession of balls carried by the bar can travel in either direction, determined by the direction of straight line movement of the particular rail contacting and supported by the endless procession of balls carried by the bar complementary to said rail. For example, each bar 34, 36, has a deep ball groove 34b, throughout the length of its inner or rear longitudinal edge, of vertical width and depth in excess of the diameter of the balls. The open longitudinal side of this groove of the bars 34 is closed by a wall 34e, of the base 33, where the bar is secured to the base or by a wall 34e, of the saddle 32, where the bar is secured to the saddle. The deep ball return groove 34b, of each bearing bar 36 is closed at its open side by a gib 37.

The bars 34, 36, have fixed end blocks or portions 40, forming end extensions thereof providing semi-circular return bend tunnels 40e, that complete the endless ball raceway or circuit from both ends of the V-groove g, of the bar to the corresponding ends of the deep return groove 34b of the bar. The end extensions 40 also provide curved fixed switch points 40d, that close the ends of the V-grooves and deflect the travelling balls therefrom into a tunnel 40e, and from a tunnel into the V-groove. The endless ball circuit or confining raceway of each bar is designed to permit the endless procession of balls to freely travel along the V-groove and from one end thereof through the tunnel 40e at that end, to freely return through groove 34b, and the opposite end tunnel 40e, to and into the other end of the V-groove.

The end extensions 40, preferably carry felt pads 41, fitting into the straight V-groove of the rails 35, with a wiping, rubbing fit.

The table members, such as 31 and 32, to which rails 35 are fixed, preferably have felt pads 41a, fixed thereto and covering the narrow space between the complementary V-grooved edges of the rails 35 and their companion bars, and the table members to which the bearing bars are fixed preferably carry similar long felt pads 41a, closing the bottom narrow space between the complementary V-grooved straight edges between the bars and their companion rails.

We desire to cover and protect our invention as broadly as is legally possible, as well as fully as to the particular embodiment disclosed for purposes of explanation but not for limitation as to the broader aspects of our invention.

What we claim is:—

1. In combination, a cutter head; a tracer stylus head arranged in relatively normally fixed relation to said cutter head; a relatively longitudinally movable cutter carried by the cutter head; a relatively longitudinally movable stylus carried by the stylus head; a hand operated feed means for simultaneously moving the cutter and stylus longitudinally toward and from operative positions and for holding the same in operative and withdrawn positions; and means under the control of the operator for holding the work and pattern in fixed relative relationship and for simultaneously moving the same laterally, while maintaining said relationship, into operative relations with the cutter and stylus, respectively, said last mentioned means including a sensitive work and pattern carrier universally laterally movable, and an actuating and holding handle having power multiplying operative connection with said carrier, said handle being arranged with respect to said feed means for operation by one hand of the operator while his other hand is applied to said feed means.

2. In combination, in a machine tool, a table mounted for universal lateral movements; a lever having its fulcrum supported independently of said table to afford said lever universal lateral swing; and an operative push and pull connection from said lever to said table for moving the table, the mounting for said table including a base, a saddle mounted on the base for straight line movement, said table mounted on the saddle for straight line movement perpendicular to the saddle movement, and endless travelling circuits of travelling balls supporting the table on the saddle and the table and saddle on the base, and confining the table, saddle and base together against vertical separation and rendering the table sensitive.

3. In combination, in a machine tool, a base; a saddle supported on the base and confined to a straight path of movement on the base; a table supported on the saddle and confined to a straight line path of movements with respect to the saddle and freely movable laterally with respect to the base; means whereby the table can be releasably and abnormally locked to the base against relative movement including rigid locking portions of the table and base adapted to be brought into registration for table locking by movement of the table to approximate central position; and manually actuated means operatively coupled to the table for moving the same on its movements with respect to the saddle, and on its movements when propelling the saddle.

4. In combination, in a machine tool, a laterally movable table constituting one member; a carrier therefor constituting another member; and bearings supporting the table from the carrier, embodying elongated spaced parallel straight rails fixed to one of said members, and each throughout the length of a straight longitudinal edge wall having a longitudinal groove forming approximately one half of a ball confining raceway; straight spaced bars complementary to said rails, respectively, and parallel therewith and fixed to the other member, and each throughout one straight longitudinal edge having a longitudinal groove forming the other approximately half of a ball confining raceway complementary to the groove of its complementary rail, to receive and confine a row of table supporting and bearing balls; means providing a completing ball raceway transversely and longitudinally of each bar between the ends of the straight ball raceway between the complementary grooved edges of a rail and its complementary bar; and an endless procession of table supporting bearing balls in said straight and completing raceway and adapted to travel therein.

5. An attachment for a machine tool having a cutter head carrying a vertical rotary cutter spindle and means for feeding the same to and from the work, and also having a work table adapted to receive a freely laterally movable combined work and pattern table, said attachment comprising a tracer stylus head, a vertical stylus spindle in said head, means for longitudinally moving said spindle in said stylus head including a transverse shaft, a transverse stylus head supporting housing for said shaft; and means whereby said housing can be removably secured to said cutter head, with the shaft in operative relation to said cutter spindle feeding means and with the stylus head in operative fixed relation to said cutter head and table.

6. In combination, in a duplicating apparatus that includes a depending driven cutter and a depending stylus supported in fixed lateral relation and provided with means for feeding the same vertically as a unit; a combined work and pattern table supported independently of and arranged below the cutter and stylus and universally movable laterally, and provided with a controlling handle having power multiplying leverage connection with the table for shifting the same laterally and holding the same against the thrust of the cutter on the work; and a mounting for said table rendering the same sensitive and universally laterally movable, including endless series of travelling balls supporting the table against substantial vertical movements and confining the same to said mounting, and means confining and supporting said balls and providing endless raceways for said series of travelling balls.

7. In a duplicating machine; a sensitive table universally laterally movable and provided with controlling and shifting means; and a mounting for said table rendering the same sensitive and laterally movable, including a base, a saddle, endless series of travelling balls supporting the table from and confining the same to the saddle, endless series of travelling balls supporting the saddle and table from the base and confining the saddle thereto, and means providing endless raceways in which said balls travel and are confined embodying an elongated rail, and a complementary parallel elongated bar, for each endless series of traveling balls, the adjoining longitudinal edges of the rail and bar forming ball receiving grooves with a straight line of balls interposed between the rail and bar and confined in the grooves thereof, and packing strips parallel with the rail and bar at said adjoining edges thereof and above and below the line of travelling balls confined by said grooves.

8. A three dimensional duplicating machine, including a table mounted for free and easy universal lateral movements in a normally fixed plane; a table-controlling handle provided with a support, said handle being universally movable laterally and provided with operative power-multiplying push and pull and holding connection with said table for propelling the table on its universal lateral movements and controlling the lateral position thereof; a rotary driven cutter for three dimensional operative association with the work fixed on said table; a stylus for three dimensional tracing of the pattern fixed on said table; supporting means for maintaining the cutter and the stylus in fixed lateral relation and against normal lateral movements; and manually-controlled feed means for feeding the cutter and the stylus as a unit into operative depth association with the work and the pattern, respectively, and for holding the same thereto, while a hand of the operator through the medium of said laterally movable handle and its said operative connection with the table, controls the lateral positions of the table to maintain the operative lateral association of the work and pattern with the cutter and stylus, respectively, and to hold the table against the lateral thrust of the rotary cutter on the work.

9. In combination; a cutter head provided with a relatively movable cutter; a tracer stylus head provided with a relatively movable stylus; supporting means maintaining said two heads normally fixed; feed means under the control of the operator for simultaneously moving the cutter and stylus toward and from operative positions and for holding them to operative positions; and means under the control of the operator for holding the work and the pattern in fixed relative relationship and for simultaneously moving the same laterally into operative association with the cutter and tracer respectively, said last mentioned means including a carrier normally operatively mounted against vertical movement and for free universal lateral movements, and a carrier actuating and controlling handle having power multiplying operative connection with said carrier for propelling the carrier on its universal lateral movements and for holding the carrier laterally against the lateral thrust of the cutter on the work, said handle being arranged with respect to said feed means for operation by one hand of the operator while his other hand is applied to said feed means.

10. In a duplicating machine, a table member adapted to maintain the lateral dimensional operative relation between the cutter and stylus, and work and pattern; and a mounting rendering said table member universally laterally movable, including a base member, and a saddle confined to the base member for straight line lateral movements, said table member confined to said saddle for straight line lateral movements at right angles to said saddle movements, a vertical stop post rigid with one of said members and an annular abutment rigid with the other member and surrounding the free end of said post and adapted to laterally abut the free end of the post in defining the limits of relative lateral movements of the table member, said saddle providing a vertical opening for the passage of said post and for the relative lateral movements of the saddle.

11. In a duplicating machine having a machine table below its cutter and tracing stylus; a table member adapted to have the work and the pattern fixed thereon for operative association as a unit, with the cutter and the stylus provided by said machine; a mounting for said table member rendering the table member universally laterally movable, said mounting including a base and a relatively laterally movable saddle coupled to the base against normal vertical separation, said table member being coupled to said saddle against normal vertical separation and for relative lateral movement; said base provided with a projecting arm, said table member provided with a projecting propelling and controlling arm; and a universally laterally swingable lever operatively coupled to said arms to establish a power-multiplying operative connection with the table member for propelling the same; said table member and its said mounting and lever being applicable to and removable from said machine table, as a unit.

12. In a duplicating machine; a member adapted to control and effect the relative universal lateral movements between the cutter and stylus on the one hand and the work and the pattern on the other hand; a supporting and confining mounting for said member rendering the same universally laterally movable; and a laterally movable member propelling and controlling handle having power-multiplying operative connection with said member; said mounting including a saddle, and a base, said table member confined to said saddle for relative straight-line lateral movements, said saddle confined to said base for relative straight-line lateral movements substantially perpendicular to said member movements, member supporting rotary balls interposed between said member and said saddle and coupling the member to the saddle against vertical separation and confining the member to said straight line movements, and member and saddle supporting rotary balls interposed between said saddle and said base and coupling the same together against vertical separation and confining said saddle to its said straight line movements.

13. In a duplicating machine; a table; a supporting and confining mounting for said table rendering the same universally laterally movable; and table propelling means; said table having parallel spaced longitudinal straight-line V-grooves each forming a partial raceway for a row of rolling balls; said mounting including a saddle having longitudinal straight-line V-grooves beside and complementary to said grooves of the table, respectively; a row of table supporting rolling balls in each raceway formed by a table groove and its complementary saddle groove, said balls confining the table to straight-line lateral movements and coupling the table and saddle together against vertical separation; a base having parallel spaced longitudinal straight-line V-grooves at right angles to said table grooves and each forming a partial raceway for a row of rolling balls, said saddle having grooves complementary to said base grooves to form ball raceways; and a row of table and saddle supporting rolling balls in each of said last named raceways confining the saddle to relative straight line lateral movements and coupling the saddle to the base against vertical separation therefrom.

14. A three dimensional duplicating apparatus for reproducing the pattern in the work, comprising supporting means; a rotary cutter; a tracer stylus normally maintained in fixed laterally spaced relation with respect to said cutter; manually actuated feed mechanism for causing relative depth cutting and tracing, and separating movements between the cutter and stylus and the work and the pattern, to bring the cutter and the stylus and the work and the pattern into and from depth cutting and tracing operative association; and manually actuated mechanism for causing universal lateral movements between the cutter and stylus and the work and pattern, for controlling and maintaining the lateral-dimensional cutting and tracing operative association of the cutter and work, and the stylus and pattern, said last mentioned mechanism embodying a table sensitively mounted for free and easy universal lateral movements in a normally fixed plane, relatively to its mounting and an independently mounted table actuating and controlling handle universally laterally movable and provided with operative power-multiplying connection with said table.

15. A three dimensional duplicating apparatus wherein a cutter and a tracer stylus are maintained in normal laterally spaced relation, and wherein the work and the pattern are arranged opposite the cutter and the tracer, respectively; including manually controlled means for causing relative depth cutting and tracing and return movements between the cutter and tracer and the work and pattern to bring the cutter and the work and the tracer and the pattern to and hold the same in operative depth cutting and depth tracing association; and manually-actuated means for causing universal lateral cutting and tracing movements between the cutter and the tracer and the work and pattern, embodying a member provided with a supporting mounting by which said member is rendered freely and universally movable laterally and is held against substantial relative vertical movements, and a member-propelling and controlling handle provided with operative power-multiplying and controlling connection with said member.

16. A duplicating apparatus, embodying a cutter; a stylus supported in normally fixed lateral relation with respect to the cutter; means for feeding the cutter and the stylus to and for holding the same in operative depth cutting and tracing association with work and a pattern, respectively; a table adapted to have the work and the pattern fixed thereto; a manually-actuated controlling and propelling member mounted independently of said table and provided with power-multiplying operative leverage connection with said table for shifting the table laterally and holding the same against the lateral thrust of the cutter on the work; and a supporting mounting for said table rendering the table freely and easily universally laterally movable under the propelling action of said member and its operative connection with the table.

17. In a duplicating machine; a combined work and pattern table sensitively mounted for universal lateral movements; a universally laterally movable handle provided with power multiplying push, pull and holding connection with said table for propelling the same on its universal lateral movements; a driven cutter for three dimensional operation on said work; a stylus for tracing the three dimensions of said pattern; and means for feeding said cutter and stylus toward and from operative association with the work and pattern, and into the same during depth cutting and tracing, including a feed operating handle arranged with respect to the table moving and holding handle to permit the operator to observe the work and cutter and pattern and stylus while one hand operates the table handle and the other hand operates the cutter and stylus feed handle.

18. In a duplicating machine; a sensitive table universally laterally movable and provided with controlling and shifting means; and a mounting for said table rendering the same sensitive and laterally movable, including a base, a saddle, series of travelling balls supporting the table from and confining the same to the saddle, series of travelling balls supporting the saddle and table from the base and confining the saddle thereto, and means providing raceways in which said balls are confined embodying an elongated rail, and a complementary parallel elongated bar, for each series of travelling balls, the adjoining longitudinal edges of the rail and bar forming ball receiving grooves with a straight line of balls interposed between the rail and bar and confined in the grooves thereof.

19. In duplicating apparatus; a table for maintaining the lateral dimensional operative association of the cutter and work and stylus and pattern; a mounting for said table rendering the same universally and freely movable laterally; and manual control mechanism for propelling the table on its universal lateral movements, including a lever having a universally laterally swingable long arm and a universally laterally swingable short power-applying arm laterally rigid with said long arm, said long arm joined to said short arm intermediate the length of the short arm, an independent support, a direct universal fulcrum coupling for said lever between one end of said short lever arm and said support confining said lever to said universal lateral swing, and a direct confining universal push and pull coupling between a fixed part of said table and the other end of said lever short arm, positively uniting the table to the lever to instantly respond laterally to lever movements and control.

20. In duplicating apparatus; a table for maintaining the lateral dimensional association of cutter and work during the operation of duplicating a pattern in the work; a mounting for said table rendering the same freely universally laterally movable; said table having a projecting push, pull and holding element; a fixed member with a portion opposite and spaced from said table element; and manual control mechanism for propelling said table on its universal lateral movements, including a lever having a short power-applying arm arranged transversely between said fixed member portion and said table element, and at one end fulcrumed on and confined to said portion at a fixed point for relative universal lateral swing thereon, and at the other end directly coupled and confined to said element at a fixed point for relative universal lateral swing thereon, and a relatively long lever arm joined into said short arm between the ends of said short arm for simultaneous lateral swing of said long and short arms as a unit.

21. In duplicating apparatus; a table provided with a mounting rendering the table freely universally laterally movable, said table having a push, pull and holding portion for propelling the table laterally and controlling the lateral positioning thereof; a normally relatively fixed support arranged adjacent to and spaced from said portion; and a universally laterally swingable manually-controlled lever directly coupled to said portion for propelling said table on its said lateral movements and for controlling the lateral positioning thereof, said lever including a long lever arm and a short lever arm, said short arm arranged transversely of and between said support and said portion and confined to said portion at a fixed point against relative movement longitudinally thereof and for relative universal lateral swing in pushing, pulling and laterally holding said portion, and a ball and socket joint directly coupling the other end of said short arm to said support and constituting the lever fulcrum confined at a fixed point on said support against relative lever longitudinal movement.

22. In duplicating apparatus; a table for maintaining the lateral dimensional operative association of the cutter and work; a mounting for said table rendering the same freely universally laterally movable, said table provided with a propelling and holding portion; a normally fixed support arranged opposite and spaced from said portion; and a manually-controlled universally swingable lever for propelling and laterally holding said table through the medium of said portion, said lever embodying a long lever arm and a power-applying short lever arm, said short arm being arranged between said portion and said support and fulcrumed to said support at a fixed point thereon, against relative longitudinal lever movement and for relative universal lateral lever swing, the opposite end of said short arm being coupled to said portion against relative lateral and longitudinal movements thereon and for relative universal lateral lever swing, said short arm including means rendering said short arm yieldingly longitudinally extensible to compensate the varying distances between the support and said portion during lever swing.

23. In duplicating apparatus; a table mounted for universal lateral movement and provided with a propelling and holding portion; a normally fixed support spaced from said portion; and a manually-controlled universally laterally swingable lever for laterally propelling and holding said table, said lever including a long lever arm embodying a laterally offset portion provided with an end split clamping hub, and a power-applying short lever arm extending through and normally rigidly held by said hub, said short arm at one end fulcrumed to said support for relative universal lateral swing thereon and extending therefrom to said portion transversely thereof and at its opposite end coupled to said portion for universal lateral swing with respect thereto and against relative lateral movement.

P. M. HENKES.
GEO. GORTON, III.
GEORGE HORNER.